US009356496B2

(12) United States Patent
Hannewald

(10) Patent No.: US 9,356,496 B2
(45) Date of Patent: May 31, 2016

(54) METHOD FOR PRODUCING A BLDC MOTOR

(71) Applicant: Thomas Hannewald, Griesheim (DE)

(72) Inventor: Thomas Hannewald, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 231 days.

(21) Appl. No.: 14/352,010

(22) PCT Filed: Oct. 15, 2012

(86) PCT No.: PCT/EP2012/070371
§ 371 (c)(1),
(2) Date: Apr. 15, 2014

(87) PCT Pub. No.: WO2013/057064
PCT Pub. Date: Apr. 25, 2013

(65) Prior Publication Data
US 2014/0259637 A1    Sep. 18, 2014

(30) Foreign Application Priority Data

Oct. 18, 2011    (DE) .......................... 10 2011 084 702

(51) Int. Cl.
H02K 15/02    (2006.01)
H02K 15/10    (2006.01)
H02K 15/03    (2006.01)
H02K 29/08    (2006.01)

(52) U.S. Cl.
CPC ................ H02K 15/03 (2013.01); H02K 29/08 (2013.01); *Y10T 29/49012* (2015.01)

(58) Field of Classification Search
CPC .. H02K 29/08; H02K 15/03; Y10T 29/49012; Y10T 29/49009

USPC ........ 29/598, 596, 607; 318/67 R, 68 R, 150, 318/168, 538, 539
See application file for complete search history.

(56) References Cited

U.S. PATENT DOCUMENTS

| 4,638,197 | A | * | 1/1987 | Kalagidis ............... H02K 29/08 310/268 |
| 4,862,044 | A | | 8/1989 | Karashima et al. |
| 5,717,268 | A | | 2/1998 | Carrier et al. |
| 7,528,564 | B2 | * | 5/2009 | Maldener ............... H02K 15/00 318/150 |
| 2005/0212367 | A1 | | 9/2005 | Blase et al. |
| 2009/0079280 | A1 | | 3/2009 | Terauchi et al. |

FOREIGN PATENT DOCUMENTS

CN    100342626    10/2007
DE    11 2006 000 828    3/2008

* cited by examiner

*Primary Examiner* — Thiem Phan
(74) *Attorney, Agent, or Firm* — Cozen O'Connor

(57) ABSTRACT

A method for producing a brushless DC (BLDC) motor includes: providing a stator, a rotor having a shaft and a carrier element having a cutout through which the shaft passes, on which surface a plurality of Hall sensors are arranged with respect to the center point of the shaft, the carrier element being arranged fixedly with respect to the stator; prefixing a permanent magnet wheel with transducer magnets, on the shaft on a side of the carrier element facing away from the rotor magnet; setting the shaft into rotary motion, and detecting measurement signal profiles of the Hall sensors and measurement signal profiles representative of voltages induced in the coils depending on the rotor magnets; determining an adjustment angle for the permanent magnet wheel; rotating the permanent magnet wheel with respect to the shaft corresponding to the determined adjustment angle; and fixing the permanent magnet wheel on the shaft.

7 Claims, 3 Drawing Sheets

METHOD FOR PRODUCING A BLDC MOTOR

CROSS-REFERENCE TO RELATED APPLICATIONS

This is a U.S. national stage of application No. PCT/EP2012/070371, filed on 15 Oct. 2012, which claims priority to the German Application No. 10 2011 084 702.2, filed 18 Oct. 2011, the content of both incorporated herein by reference.

BACKGROUND OF THE INVENTION

1. Field of the Invention

The present invention relates to a method for producing a brushless DC motor.

2. Related Art

Electric motors generally have a rotor and a stator. In particular in the field of vehicle engineering, so-called brushless DC motors, which are also referred to as BLDC motors, are becoming increasingly prevalent. Such BLDC motors are synchronous machines which are driven by a direct current and have an electrical commutation device, instead of mechanical commutators and brushes.

In this way, less friction in comparison with motors having commutators and brushes is ensured, which has a positive effect on efficiency. Furthermore, so-called brush sparking can be avoided, which results in electrical losses and also contributes to increased mechanical wear.

The rotor of the BLDC motor has rotor magnets, which are in the form of permanent magnets. Owing to the fact that there is no need for any windings of coils on the rotor, the windings are also not subjected to centrifugal forces. In addition, windings are only arranged on the stator, with the result that no air cooling in the region of the rotor is necessary for cooling purposes and therefore the inner region, in particular the region of the rotor in which the rotor magnets are arranged, can be encapsulated so as to seal it off from the outside and can thus also be protected from dirt particles and other external particles.

SUMMARY OF THE INVENTION

An object on which the invention is based consists in providing a method for producing a BLDC motor which makes a contribution to a high degree of efficiency during operation of the BLDC motor produced in this way.

Such object is achieved, in accordance with a first aspect, by a method for producing a BLDC motor, in which a stator having coils, which are assigned at least to two different phases, is provided. A rotor is provided, which comprises a shaft and comprises rotor magnets arranged on the shaft. The rotor is arranged in a cavity of the stator. The shaft is mounted by a first bearing, arranged between the shaft and the stator. A carrier element is provided, which has a cutout, through which the shaft passes, and which has a surface formed orthogonally to the shaft, i.e. in particular to its mid-axis, on which surface a plurality of Hall sensors are arranged with an angular offset to one another with respect to the center point of the shaft. The carrier element is arranged fixedly with respect to the stator.

A permanent magnet wheel with transducer magnets arranged with an angular offset is prefixed on the shaft, in particular, on a side of the carrier element that faces away from the rotor magnets. The permanent magnet wheel is spaced axially apart from the carrier element such that, in the event of a rotary motion of the shaft caused by the magnetic fields of the transducer magnets, correspondingly desired measurement signal profiles are brought about in the Hall sensors.

The shaft is set in rotary motion and measurement signal profiles of the Hall sensors are detected. In addition, measurement signal profiles representative of voltages induced in the coils, depending on the rotor magnets, i.e. the magnetic fields caused thereby, are also detected. Depending on the measurement signal profiles of the Hall sensors and the temporally correlating measurement signal profiles which are representative of voltages induced in the coils, an adjustment angle for the magnet wheel is determined. The permanent magnet wheel is rotated corresponding to the determined adjustment angle with respect to the shaft and then the permanent magnet wheel is fixed on the shaft.

In this way, it is possible in a particularly effective and simple manner to make a contribution to providing the possibility of precisely determining the relative position of the rotor with respect to the stator during subsequent operation of the BLOC motor, to be precise in particular in respect of the relative position of the respective coils on the stator and the respective rotor magnets on the rotor. In this way, actuation of the coils, which takes place depending on the respective measurement signal profiles of the Hall sensors, can then be particularly precise and thus an important contribution can be made to a high degree of efficiency during operation of the BLDC motor.

In accordance with a second aspect, in a method for producing a BLDC motor, a stator having coils, which are assigned to at least two different phases, is provided. A rotor is provided which comprises a shaft and rotor magnets arranged on the shaft. The rotor is arranged in a cavity of the stator. The shaft is mounted by a first bearing, arranged between the shaft and the stator. A carrier element is provided, which has a cutout through which the shaft passes and which has a surface formed orthogonally to the shaft, i.e. in particular its mid-axis, on which surface a plurality of Hall sensors are arranged with an angular offset to one another with respect to the center point of the shaft. The carrier element is arranged fixedly with respect to the stator.

The shaft is set in rotary motion and, with a time correlation with respect thereto, measurement signal profiles representative of voltages induced in the coils depending on the rotor magnets and in particular on the magnetic fields brought about thereby are detected.

In the event of the identification of a reference angle position of the shaft relative to the stator that is identified depending on the measurement signal profiles, which are representative of voltages induced in the coils, the shaft is held in the identified reference angle position. Then, a permanent magnet wheel with transducer magnets, arranged with an angular offset, is fitted on the shaft, in particular, on a side of the carrier element remote from the rotor magnets. In principle, the permanent magnet wheel can also be fitted on the shaft prior to the shaft being set into rotary motion in order to identify the reference angle position.

The permanent magnet wheel is rotated with respect to the shaft until a predetermined condition is met, which is dependent on a detected measurement signal profile of the Hall sensors during the rotation, wherein the shaft continues to be held in the reference angle position during this rotation. Once the predetermined condition has been met, the permanent magnet wheel is fixed on the shaft and the holding of the shaft in the reference angle position is canceled.

The advantages of the second aspect correspond in principle to those of the first aspect.

In accordance with an advantageous configuration, the meeting of the predetermined condition is dependent on the fact that the measurement signal profile of at least one of the Hall sensors represents a switching point. The respective switching point correlates in particular with pole changes of the magnet wheel rotating relative to the carrier element. In this case, the respective switching point can relate to one of the Hall sensors or else relate to the switching points of a plurality of Hall sensors and have a predetermined interaction with the respective switching points as a condition.

In accordance with a further advantageous configuration, the fixing of the permanent magnet wheel on the shaft comprises laser welding. In this way, the permanent magnet wheel can be fixed in the respective position, to be precise permanently fixed, in a particularly precise and simple manner.

In accordance with a further advantageous configuration, once the permanent magnet wheel has been fixed, an end plate with a bearing is fitted and the shaft is mounted on the bearing. The bearing is arranged on a side of the permanent magnet wheel which is remote from the rotor magnet. In this way, the permanent magnet wheel can then be easily accessible to corresponding tools prior to fixing of the permanent magnet wheel on the shaft and afterwards the shaft can be mounted in a reliable manner and possibly at the same time corresponding sealing of the cavity of the stator can be implemented.

BRIEF DESCRIPTION OF THE DRAWINGS

Exemplary embodiments of the invention will be explained in detail below with reference to the schematic drawings, in which.

DETAILED DESCRIPTION OF THE PRESENTLY PREFERRED EMBODIMENTS

Elements having the same construction or function are characterized by the same reference symbols throughout the figures.

Figure 1:
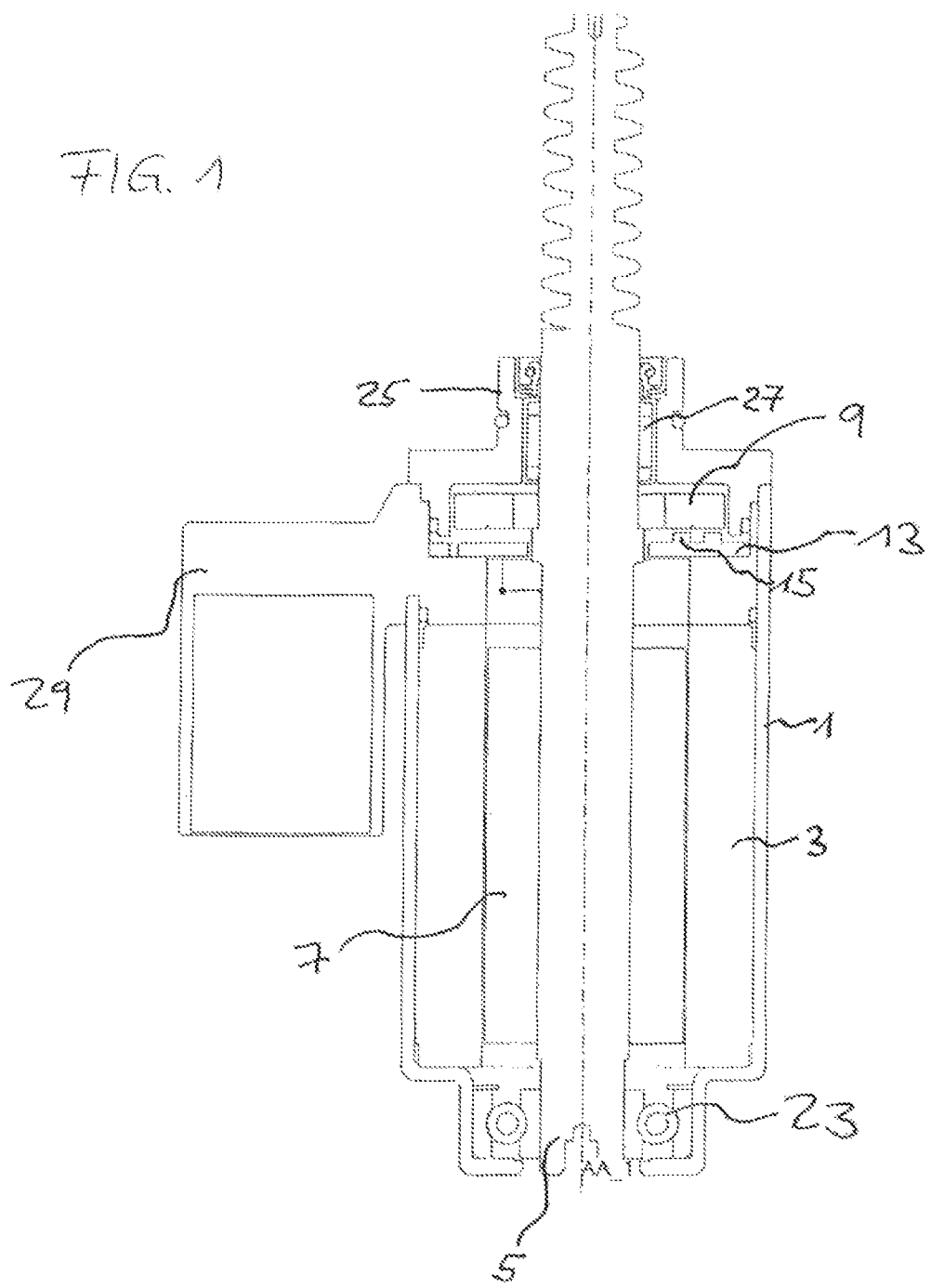
FIG. 1 shows a BLDC motor whose production is complete.

A BLDC motor has a stator with a stator housing 1 (see FIG. 1), in which coils 3 are arranged. The coils 3 are assigned to at least two different phases, for example three different phases. In addition, the BLDC motor comprises a rotor, which comprises a shaft 5 and rotor magnets 7 arranged on the shaft. The rotor magnets 7 can be adhesively bonded to the shaft, for example, and/or fixed on the shaft by a cage, for example a block cage. The rotor is arranged in a cavity in the stator. The shaft 5 is mounted by a first bearing 23, arranged between the shaft 5 and the stator, in particular the stator housing 1. The first bearing 33 is preferably arranged in a first end region of the shaft 5.

In addition, a carrier element 13 is provided, which has a cutout through which the shaft 5 passes and which has a surface formed orthogonally to the shaft 5, in particular its mid-axis, on which surface a plurality of Hall sensors 15, 17, 19, 21 (FIG. 2) are arranged with an angular offset to one another with respect to the center point of the shaft 5. The carrier element 13 is arranged fixedly with respect to the stator. Preferably, the carrier element comprises a printed circuit board with electrical conductor tracks and/or electrical or electronic components and/or sensors. The sensors are in the form of Hall sensors 15, 17, 13, 21, for example.

In addition, a permanent magnet wheel 9, fixed on the shaft 5 when production of the BLDC motor is complete, is arranged on a side of the carrier element 13 which is remote from the rotor magnets 7. The permanent magnet wheel 9 has transducer magnets 11 (see FIG. 2), which are arranged with an angular offset and are in the form of permanent magnets, and is arranged axially spaced apart from the carrier element 13 in such a way that the magnetic fields produced by the transducer magnets 11 act in a desired manner on the Hall sensors 15, 17, 19, 21 to be precise given a relative rotary motion between the permanent magnet wheel 9 and the carrier element 13.

Figure 2:
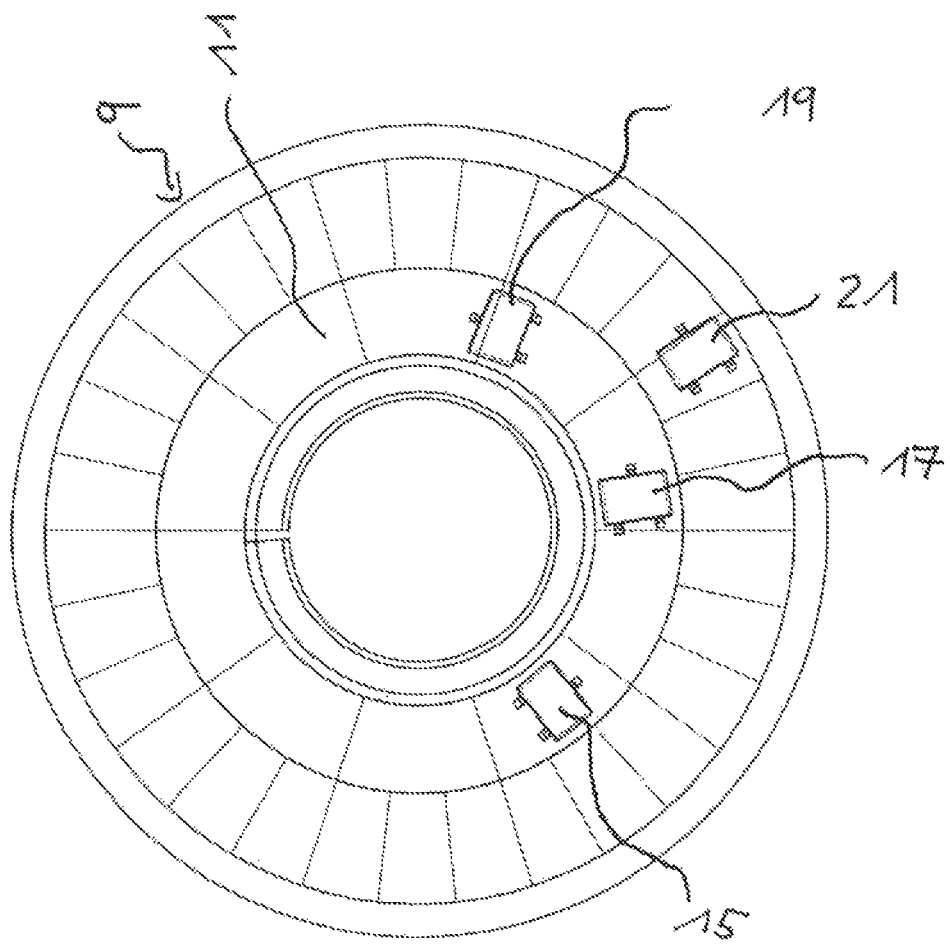
FIG. 2 shows a plan view of a permanent magnet wheel of the BLDC motor shown in FIG. 1.

In FIG. 2, only one transducer magnet has been provided with the reference symbol 11. However, the permanent magnet wheel 9 preferably has a large number of transducer magnets 11 as can also be seen more clearly in FIG. 2.

FIG. 2 illustrates the Hall sensors 15, 17, 19, 21 in the position they have relative to one another on the carrier element 13, without the carrier element 13 being illustrated in FIG. 2. Their position in the radial direction starting from the center point of the shaft 5 with respect to the permanent magnet wheel 9 is shown in FIG. 2, wherein the illustration in FIG. 2 of course only represents a position that the permanent magnet wheel 9 assumes relative to the Hall sensors 15, 17, 19, 21 arranged on the carrier element 13.

The carrier element 13 has circuit breakers, by which a current supply to the coils 3 is controlled. These circuit breakers are in particular switched depending on the characteristic measurement signal profiles of the respectively assigned Hall sensors 15, 17, 19 and therefore effect a current supply or current interruption to or with respect to the respective coils and therefore with respect to the respective phases. The characteristic measurement signal profile is in particular a considerable change in the measurement signal, also referred to as switching point, caused by a significant change in the magnetic field passing through the Hall sensor 15, 17, 19.

In addition, the BLDC motor has an end plate 25 having a second bearing 27, in which the shaft 5 is likewise mounted. The end plate 25 mounts the shaft 5 on a side remote with respect to the rotor magnets 7 in comparison with the first bearing 23. The second bearing 27 is in addition arranged on a side of the permanent magnet wheel 9 remote from the rotor magnets 7. Preferably, the end plate 25 also comprises a seal, which seals off the cavity of the stator.

In addition, the BLDC motor has a male connector element 29, which is provided with an external control and supply unit for the electrical contact-making of the BLDC motor and which has contacts that are electrically conductively coupled to the carrier element 13.

Figure 3:
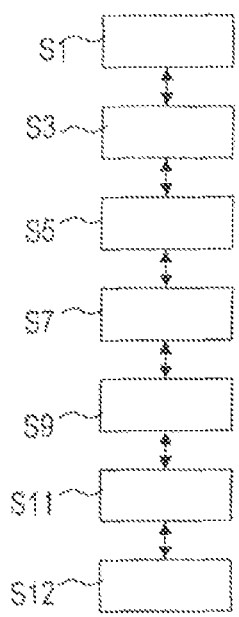
FIG. 3 shows a first flow chart of a method in connection with production of the BLDC motor.

In accordance with a first exemplary embodiment for producing the BLDC motor, the stator with the coils 3 is provided in a step S1, as shown in FIG. 3. In addition, the rotor is provided with the shaft 5 and the rotor magnets 7 arranged thereon. In this ease, the rotor is arranged in the cavity of the stator, and the shaft 5 is mounted by the first bearing 23. In addition, in step S1, the carrier element 13 is provided, specifically already in its fitted state in the stator.

In a step S3, the permanent magnet wheel 9 is prefixed on the shaft 5. It is thus fitted on the shaft 5 such that, in the event of a rotation of the shaft 5, it moves along with the shaft without performing a relative movement with respect to the shaft, but without already being permanently fixed, which provides the possibility of the permanent magnet wheel 9 still being rotated relative to the shaft 5 toy a suitable tool.

In a step S5, the shaft 5 is set into rotary motion, and measurement signal profiles of the Hall sensors 15, 17, 19, 21 are detected. In addition, with a temporal correlation with respect thereto, measurement signal profiles representative of voltages induced in the coils 3 depending on the rotor magnets 7 and the magnetic fields thereof are also detected. This can take place, for example, by corresponding detection of the current in the coils 3 caused by the induced voltages.

The shaft 5 is set into rotary motion by an external drive provided for this purpose, which drive acts on the shaft 5. In addition, preferably during the implementation of step S5, the shaft is also supported by an auxiliary bearing, which acts on the shaft 5 on a side which is remote from the rotor magnets 7 with respect to the permanent magnet wheel 9.

In a step S7, depending on the measurement signal profiles of the Hall sensors 15, 17, 19, 21 and the temporally correlating measurement signal profiles representative of voltages induced in the coils 3, an adjustment angle for the permanent magnet wheel 9 is determined. In this connection, use is made of the knowledge that the measurement signal profiles representative of voltages induced in the coils are characteristic of the respective angular position of the stator with respect to the rotor and the temporally assigned measurement signal profiles of the Hall sensors are in turn representative of the respective angular position between the permanent magnet wheel 9 and the stator. The adjustment angle in this connection is preferably determined such that the measurement signal profiles of the Hall sensors 15, 17, 19, 21, in particular in respect of their switching points, have the respectively desired relationship with respect to the respective relative angular position between the stator and the rotor.

In a step S9, the permanent magnet wheel 9 is rotated with respect to the shaft 5 corresponding to the determined adjustment angle.

In a step S1, the permanent magnet wheel 9 is then fixed on the shaft 5. This is preferably performed by laser welding, for example.

Subsequently, in a step S12, first the auxiliary bearing and the external drive are removed again and then the end plate 25 is fitted.

A second exemplary configuration for producing the BLDC motor is explained in detail with reference to the flow chart in FIG. 4. Step S13 corresponds to step S1 discussed above. In a step S15, the shaft 5 is set into rotary motion and, in the process, measurement signal profiles representative of voltages induced in the coils 3 are detected. The shaft 5 is set into rotary motion in step S15 by a drive external to the BLDC motor and coupled to the shaft 5 for this purpose. In addition, when implementing the steps, preferably an auxiliary bearing is provided, corresponding to the procedure as shown in FIG. 3.

In a step S17, when a reference angle position of the shaft 5 relative to the stator is identified, which is identified depending on the measurement signal profiles representative of voltages induced in the coils 3, the shaft 5 is then held in this identified reference position, specifically until after step S17 is complete.

In a step S19, the permanent magnet wheel 9 is fitted on the shaft 5. In a step S21, the permanent magnet wheel 9 is rotated with respect to the shaft 5 until a predetermined condition is met which is dependent on the detected measurement signal profile of the Hall sensors 15, 17, 19, 21 during the rotation. In this case, meeting of the predetermined condition is preferably dependent on the fact that the measurement signal profile of at least one of the Hall sensors represents the switching point.

Figure 4:
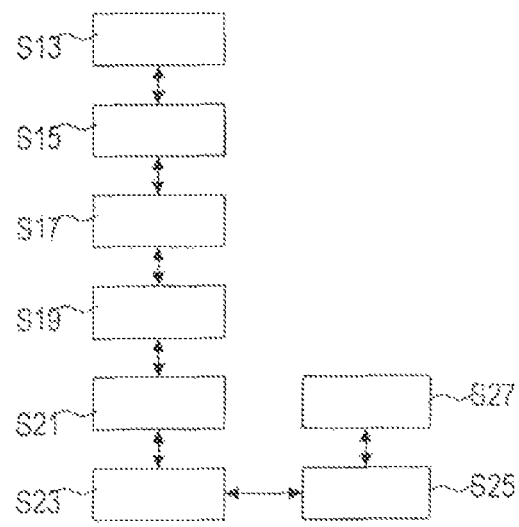
FIG. 4 shows a second flow chart in connection with the production of the BLDC motor.

That which has been said with respect to the exemplary embodiment shown in FIG. 3 is also in principle applicable with respect to the exemplary embodiment shown in FIG. 4.

In a step S23, the permanent magnet wheel 9 is fixed on the shaft 5, by laser welding, for example. In a step S25, the holding of the shaft in the reference angle position is then canceled. In a step S27, once the external drive and the auxiliary bearing have been removed, the end plate is fitted.

With respect to the assignment of the relative angular position of the rotor with respect to the stator, during production a zero crossing of the respective induced voltage can be evaluated correspondingly in particular with respect to the measurement signal profiles representative of voltages induced in the coils 3. Furthermore, during production, a corresponding adjustment of the axial spacing between the permanent magnet wheel 9 and the carrier element 13 can also take place. By virtue of the described procedure, a contribution to very low manufacturing tolerances can be made.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a brushless DC (BLDC) motor, comprising:

provided a stator having coils (3) assigned to at least two different phases;

providing a rotor comprising a shaft (5) and rotor magnets (7) arranged on said shaft, wherein the rotor is arranged in a cavity in the stator, and the shaft (5) is mounted by a first bearing (23) arranged between the shaft (5) and the stator;

providing a carrier element (13) having a cutout, through which the shaft (5) passes and having a surface formed orthogonally to the shaft (5), on which surface a plurality of Hall sensors (15, 17, 19, 21) are arranged with an angular offset to one another with respect to the center point of the shaft (5), wherein the carrier element (13) is arranged fixedly with respect to the stator;

prefixing a permanent magnet wheel (9) with transducer magnets (11), arranged with an angular offset, on the shaft (5) on a side of the carrier element (13) facing away from the rotor magnet (7);

setting the shaft (5) into rotary motion, and detecting measurement signal profiles of the Hall sensors (15, 17, 19, 21) and measurement signal profiles representative of voltages induced in the coils depending on the rotor magnets (7);

depending on the detected measurement signal profiles of the Hall sensors (15, 17, 19, 21) and on the temporally correlating detected measurement signal profiles representative of voltages induced in the coils (3), determining an adjustment angle for the permanent magnet wheel (9);

rotating the permanent magnet wheel (9) with respect to the shaft (5) corresponding to the determined adjustment angle; and fixing the permanent magnet wheel (9) on the shaft (5).

2. The method as claimed in claim 1, in which the fixing of the permanent magnet wheel (9) on the shaft (5) comprises laser wedding.

3. The method as claimed in claim 1, in which, once the permanent magnet wheel (9) has been fixed, an end plate (25) with a bearing is fitted and the shaft (5) is mounted on the bearing, wherein the bearing is arranged on a side of the permanent magnet wheel (9) remote from the rotor magnets (7).

4. A method for producing a brushless DC (BLDC) motor, comprising:

providing a stator having coils (3) assigned to at least two different phases;

providing a rotor comprising a shaft (5) and rotor magnets (7) arranged on said shaft, wherein the rotor is arranged in a cavity in the stator, and the shaft (5) is mounted by a first bearing (23) arranged between the shaft (5) and the stator;

providing a carrier element (13) having a cutout, through which the shaft (5) passes and having a surface formed orthogonally to the shaft (5), on which surface a plurality of Hall sensors (15, 17, 19, 21) are arranged with an angular offset to one another with respect to the center point of the shaft (5), wherein the carrier element (13) is arranged fixedly with respect to the stator;

setting the shaft (5) in rotary motion and in the process detecting measurement signal profiles representative of voltages induced in the coils (3) depending on the rotor magnets (7);

in the event of identification of a reference angle position of the shaft (5) relative to the stator identified depending on the detected measurement signal profiles representative of voltages induced in the coils (3), holding the shaft (5) the reference angle position;

fitting a permanent magnet wheel (9), with transducer magnets (11) arranged with an angular offset, to the shaft (5), to the side of the carrier element (13) remote from the rotor magnets (7);

rotating the permanent magnet wheel (9) with respect to the shaft (5) until a predetermined condition is met, which predetermined condition is dependent on a detected measurement signal profile of the Hall sensors (15, 17, 19, 21) during the rotation;

fixing the permanent magnet wheel (9) with respect to the shaft (5); and canceling the holding of the shaft (5) in the reference angle position.

5. The method as claimed in claim 4, in which the meeting of the predetermined condition is dependent on the fact that the measurement signal profile of at least one of the Hall sensors (15, 17, 19, 21) represents a switching point.

6. The method as claimed in claim 4, in which the fixing of the permanent magnet wheel (9) on the shaft (5) comprises laser welding.

7. The method as claimed in claim 4, in which, once the permanent magnet wheel (9) has been fixed, an end plate (25) with a bearing is fitted and the shaft (5) is mounted on the bearing, wherein the bearing is arranged on a side of the permanent magnet wheel (9) remote from the rotor magnets (7).

* * * * *